(12) United States Patent
Pulkkinen et al.

(10) Patent No.: US 6,694,141 B1
(45) Date of Patent: Feb. 17, 2004

(54) CHANNEL SELECTION IN A RADIO LINK SYSTEM

(75) Inventors: Otto Pulkkinen, Helsinki (FI); Marko Lamminaho, Espoo (FI); Imre Kekesi, Helsinki (FI); Juha Korhonen, Espoo (FI); Eija Saario, Helsinki (FI); Pekka Soininen, Helsinki (FI); Marko Heinila, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/458,933

(22) Filed: Dec. 10, 1999

Related U.S. Application Data

(63) Continuation of application No. PCT/FI98/00247, filed on Mar. 20, 1998, which is a continuation of application No. PCT/EP97/03314, filed on Jun. 24, 1997.

(51) Int. Cl.[7] ................................................ H04Q 7/20
(52) U.S. Cl. ........................ 455/454; 455/450; 455/446; 455/447
(58) Field of Search .......................... 455/62, 63, 67.1, 455/67.3, 67.5, 448, 454, 455, 450, 456, 463, 561, 562, 555, 554, 550, 575, 446, 447

(56) References Cited

U.S. PATENT DOCUMENTS

| | | | |
|---|---|---|---|
| 4,780,885 A | | 10/1988 | Paul et al. |
| 4,829,554 A | * | 5/1989 | Barnes et al. .................. 379/58 |
| 5,448,754 A | | 9/1995 | Ho et al. |
| 5,507,008 A | * | 4/1996 | Kanai et al. ................ 455/34.1 |
| 5,548,809 A | | 8/1996 | Lemson |
| 5,551,066 A | * | 8/1996 | Stillman et al. ............... 455/69 |
| 5,606,727 A | * | 2/1997 | Ueda ......................... 455/34.1 |
| 5,655,217 A | * | 8/1997 | Lemson ....................... 455/513 |
| 5,732,353 A | * | 3/1998 | Haarsen ....................... 455/450 |
| 5,933,420 A | * | 8/1999 | Jaszewski et al. ........... 370/329 |
| 6,023,459 A | * | 2/2000 | Clark et al. .................. 370/329 |
| 6,112,092 A | * | 8/2000 | Benveniste ................ 455/450 |

FOREIGN PATENT DOCUMENTS

| | | | |
|---|---|---|---|
| EP | 0 578 197 | 1/1994 | |
| EP | 0 582 373 | 2/1994 | |
| EP | 0 773 636 | 5/1997 | |
| GB | 2 250 665 | 6/1992 | |
| GB | 2250665 | * 6/1992 | ............ H04B/7/24 |
| WO | 98/02010 | 1/1998 | |

OTHER PUBLICATIONS

4/95, "Digilink 60 Professional Data Communications Point to point in 60 GHz band" Microwave Modules (UK) Ltd.
7/95 "Transmission and Multiplexing (™) Parameters for radio–relay systems for the transmission of digital signals and analogue video signals operating at around 58 GHz, which do not require co–ordinated frequency planning" ETSI 300 408.
"Trends and Design Considerations in Automated High Speed HF Data Systems" Beamish, Conference Publication No. 392; IEEE XP–002063713.
"Decentralized Power Management in RF Mesh Networks for Frequency Reuse" Lee, et al., XP–002063712.
International Search Report for PCT/EP97/003314.
International Search Report for PCT/FI98/00247.

* cited by examiner

*Primary Examiner*—Edward F. Urban
*Assistant Examiner*—Meless Zewdu

(57) ABSTRACT

The invention relates to a method of channel allocation in a fixed radio link network. For each radio link to be commissioned channels, interference level measurement on each available channel of the frequency band is carried out. Based on the interference measurements, best transmission and reception channel for the link are selected. Thereafter, the radio link can be commissioned and measurements in the next radio link to be commissioned can be started. Instead of using a fixed and pre-set channel for the fixed radio link, a channel is assigned autonomously and automatically when commissioning the link, depending on interference measurement results and/or distance measurement results. The possibility for automatic channel selection decreases the amount of commissioning work by removing the need for detailed frequency planning and fixed channel setting at the factory for each radio.

13 Claims, 6 Drawing Sheets

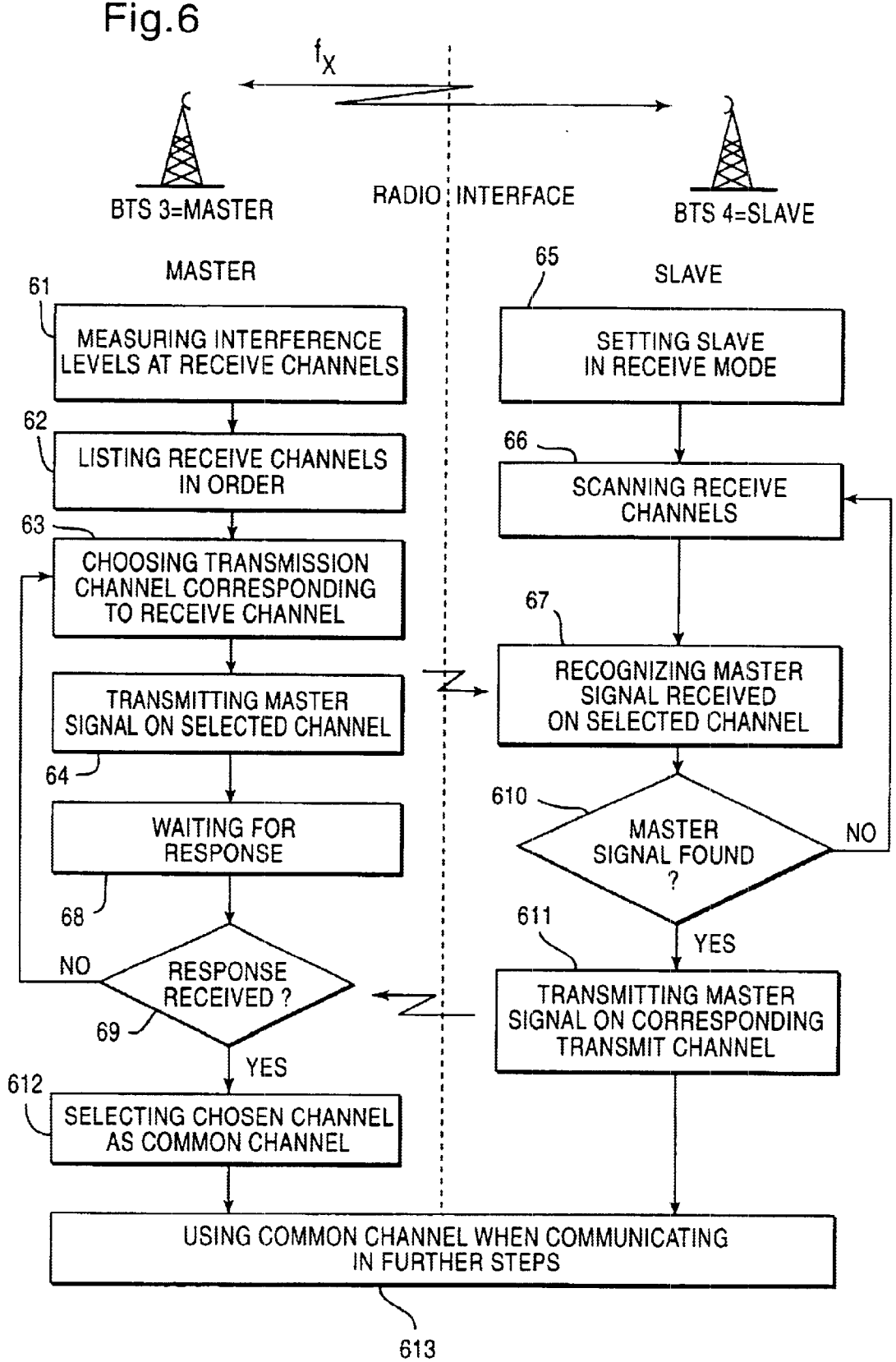

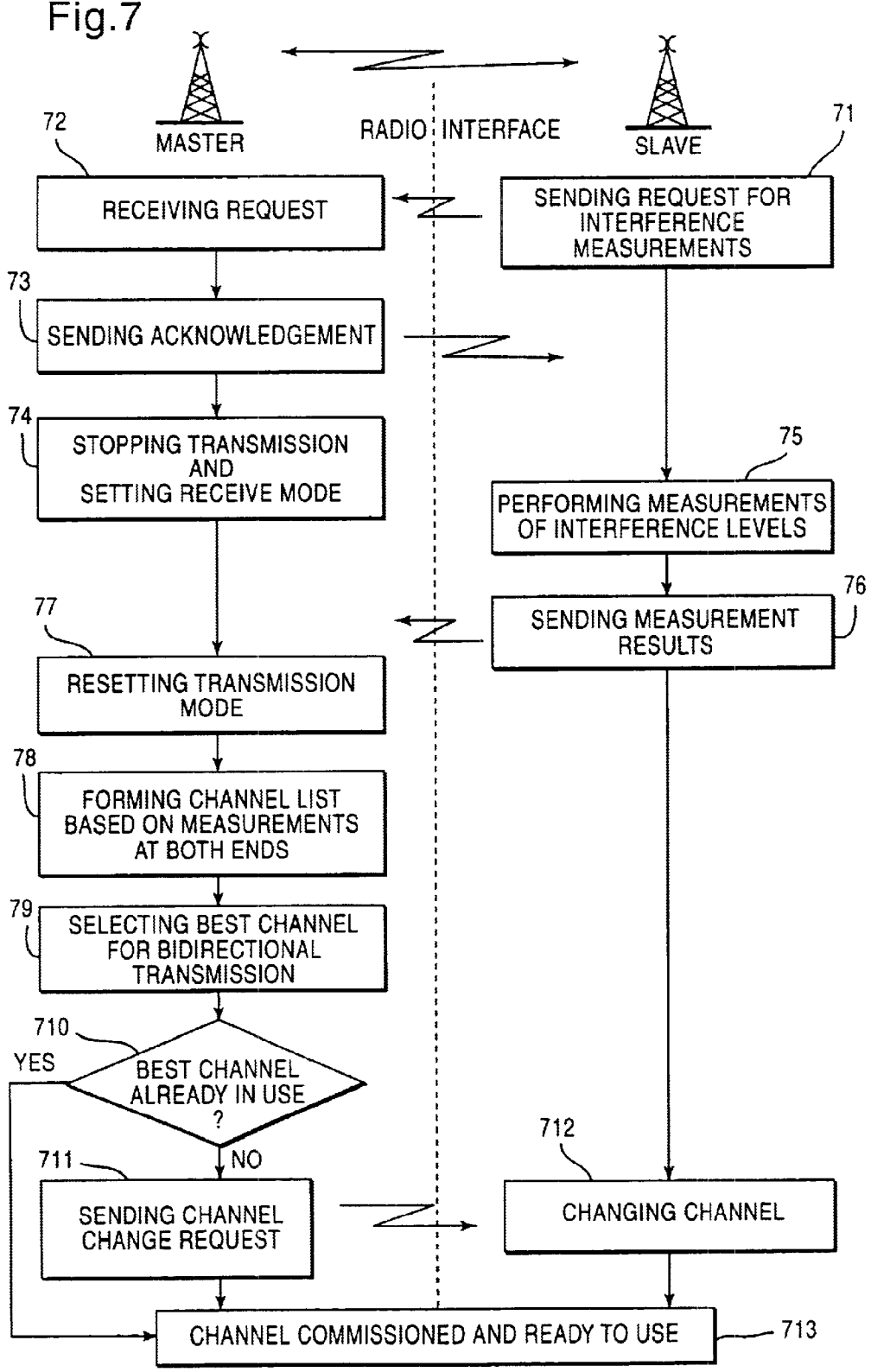

CHANNEL SELECTION IN A RADIO LINK SYSTEM

This application is a continuation of international application serial number PCT/FI98/002472, filed Mar. 20, 1998.

FIELD OF THE INVENTION

The present invention relates to a method of allocating channels for a radio link in a radio link system.

BACKGROUND OF THE INVENTION

Modern terrestrial microwave radio systems provide a feasible technical solution for telecommunications transmission links at distances from some hundreds of meters up to 80 km. Such systems are increasingly being developed in both cellular and fixed telecommunications networks. In the latter case, particularly in wireless based networks, and in the former case, in base station interconnection and a base station-a base station controller connection, a radio link system is particularly in urban areas a good solution. Unlike fiber, which can require several months for right-of-way and permits, microwave can be put into immediate operation. In addition, microwave easily goes over difficult terrain where cable cannot be laid, and microwave does not require trenching or pulling through duct work, which can take weeks or months and which increases installation costs.

A typical microwave radio site consists of an indoor mounted base band unit, an indoor or outdoor mounted radio frequency transceiver, and an parabolic antenna.

Basically there are two types of radio link network topologies in use, namely star networks and ring networks. Of course, it is common for hybrid ring and star network to be deployed.

FIG. 1 depicts an example of the star network. It contains one or more hub sites at strategic locations which serve spurs or chains of subordinate sites from the centralized hub. The hub sites are connected to the switch via a transmission link which usually is a trunk cable. The star network has one disadvantage in that outages on a single transmission link may affect many sites so lowering overall network reliability.

FIG. 2 shows a network configured in a ring structure. This structure requires some routing and grooming intelligence at all appropriate points in the network. The capacity of every link in the ring has to be sufficient to support all sites in the loop.

As mentioned above, radio link network provides one solution for realizing a cellular telecommunications network. Then, with reference to FIGS. 1 and 2, the switch might be a mobile switching centre, hub site can be a base station controller and subordinate site is a base transceiver station. Each of the radio links performs a point-to-point connection.

A message, be it audio, video, or data is modulated on the microwave signal, which is often referred to as a carrier. The maximum distance between sites, also called a hop distance, is mainly determined by propagation characteristics of electromagnetic waves. The higher the carrier frequency the greater freespace loss, or attenuation due to the atmosphere, i.e. the shorter the achievable distances. However, this also means that frequency re-use distances are shorter: the distance between links operating on the same frequency can be shorter without fear of interference. There are three types of interference which should be considered in any terrestrial radio link network: 1) intrasystem occurs when a radio signal within a multi-hop network interferes with the receiver of a different hop. 2) external disturbance occurs when a foreign system affects a signal. 3) reflection—from anything that has a reflective surface can deflect other signals into the path of the transmitted signal and the stronger signal will interfere with the weaker signal.

Radio links have traditionally operated on regulated frequency bands which further are divided to frequency channels. The use of radio channels is regulated by local authorities and based on coordinated planning. Hence, in a predetermined local area in which radio links are to be established, only a predetermined overall bandwidth and then a predetermined number of channels are available for the radio links.

When a plurality of radio links or so-called hops are present within a given area, in the regulated radio environment, the channel choice is based on coordinated frequency planning. That is, the channel to be used for a specific radio link at a time is predetermined. Nevertheless, in such a regulated radio environment, the channel to be used for a link may be changed. In other words, a channel allocation for a radio link may be periodically updated and changed.

In the planning, each radio link is represented as a variable whose domain is the set of all frequencies that are available. The objective is to assign frequencies to the radio links in order to avoid interference. Prior the planning, it is essential to determine, at the earliest opportunity, what band are locally available for fixed link systems, and what the local "link policy" is. The majority of national frequency management administrations have some form of link policy regarding link lengths and net output power expressed as an equivalent isotropically radiated power (EIPR).

Recent developments in telecommunications have, however, lead to changes with regard to frequency allocations and have thus created possibilities to operate radio links and/or hops in non-coordinated frequency bands. These specific bands are left unregulated in the sense that selection of a working channel for an individual radio terminal inside the band is not controlled by the local authorities. Instead, the channel can be selected freely as long as the general requirements associated with the band are not violated. As an example, European Telecommunication Standard ETS 300408 specifies the minimum performance parameters for radio equipment operating at frequencies around 58 GHz and not requiring coordinated frequency planning. Within this band it is of interest to share the bandwidth among different links in an efficient way.

However, this means that unlike the further above described traditional radio links within a regulated (or coordinated) radio environment, those systems operating in an non-coordinated band will operate in interference limited environment. That is, the signal quality of received signals may be deteriorated due to interference phenomena caused by neighboring radio links. Therefore, it is of increasing interest to consider how to share available bandwidth among various systems in an efficient way.

A state of the art approach for radio links operating in an non-coordinated band resides in assigning a fixed channel to each radio link or hop already at the stage of production of the respective devices at the factory. This is, for example, the approach adopted by the company "Microwave Modules Ltd.", which produces radio links for the non-coordinated 58 GHz band.

These devices which are used to establish point-to-point local networks are using fixed channel allocation principle.

Various problems as explained below may arise during operation of the system.

FIG. 3 illustrates a simplified example for a prior art non-coordinated link system and the problems associated therewith. Let us assume that within the geographic area only three channels (channel numbers 1, 2, 3) for radio links (hops) are available. Now, transceivers in the sites 21 and 22 are configured at the factory side to transmit on channel 1 so that the hop between these sites is using channel 1. Transceivers in the sites 25 and 26 are configured to transmit on channel 2 and in the sites 23 and 24 channel 3 has been preset at the factory. Due to different channels, i.e. different frequencies, this three links operate well without disturbing each other.

But, if a fourth hop, sites 27 and 28, is to be additionally established within this area, some difficulties arise. The transmitters in these sites are configured at the factory side to transmit on a specific channel denoted by channel x, x being 1, 2 or 3 in the chosen example. Consequently, due to the arrangement or configuration of the hops and the respective fixed channels thereof, a channel collision between one of the "old" hops and the new hop is extremely likely to occur in the depicted situation, irrespective of which channel (channel 1, 2, or 3) has been chosen for transmitters in sites 27 and 28.

The term channel collision in this connection means crosstalk or interference phenomena which are likely to occur between respective hops and result in a decreased transmission quality. In particular, a channel collision is defined as occurring for a radio link for which a ratio of S/I is below a given collision threshold THc, i.e. S/I<THc, with S representing signal power and I representing interference power from one or several other radio links within the same radio environment.

That is, with reference to the schematically depicted example of FIG. 3 there may either occur a channel collision between the new hop and the old hop using channel 1 in case the new hop transmits on channel 1, or a channel collision between the new hop and the old hop using channel in case the new hop transmits on channel 2, or a channel collision between the new hop and the old hop using channel 3 in case the new hop transmits on channel 3.

To be precise, for a given number of randomly placed hops within a radio environment of a well defined area, channel collisions between respective hops are very likely to occur. This, in turn, severely limits the number of radio links (hops) per area ($km^2$) of the radio environment to a value much lower than a value which should desirably be achieved.

Moreover, fixing the operating frequency (channel) of each radio link terminal at the factory does not result in a globally optimal distribution of channels. It also adds extra task in the manufacturing process. Furthermore, it complicates the planning of the radio link frequency usage in a network.

It is therefore an objective of the present invention to generally provide a method of allocating channels for a fixed radio link operating in an non-coordinated frequency band, which method allows the number of links that can be commissioned in a given area to be increased by a large factor while simultaneously lowering the above described risks of the non-coordinated frequency band.

Preferably, allocation of the radio channel for each of the links should be taken place automatically.

SUMMARY OF THE INVENTION

According to the invention, for each radio link to be commissioned channels, interference level measurement on each available channel of the frequency band is carried out. It means that channel by channel, effect of each possible interfering source to the channel frequency being examined is automatically taken into account. Sources may be transmitters of the already commissioned radio links which are using the same or near the same frequency, sources from other radio systems etc. Based on the interference measurements, best transmission and reception channel for the link are chosen. Thereafter, the radio link can be commissioned and measurements in the next radio link to be commissioned can be started.

In accordance with one embodiment, for each radio link to be commissioned, the distance from each of the already commissioned radio links having an available channel allocated thereto is measured, and based on the distance measurement, the channel or channels to be allocated to the respective radio link to be commissioned are chosen.

Stated in other words, instead of using a fixed and pre-set channel for the fixed radio link, a channel is assigned autonomously and automatically when commissioning the link, depending on interference measurement results and/or distance measurement results. In a frequency band where the individual channels are freely selectable the possibility for automatic channel selection decreases the amount of commissioning work by removing the need for detailed frequency planning and fixed channel setting at the factory for each radio.

Another advantage is that the proposed method also ensures an efficient distribution of the channel usage in the network. If the channel allocation were based on fixed frequency settings, the resulting channel distribution in the network would not be optimal in terms of maximum hop density. In contrast, the automatic channel selection utilizes an algorithm where the channel selection is based on the measured interference from other radio links and makes it possible to install a larger number of hops in a given area.

Accordingly, due to the above described methods for allocating channels for a fixed radio link operating in a non-coordinated frequency band, the present invention provides the advantage that the number of links (hops) that can be-commissioned in a given radio environment area can be increased by a large factor. At the same time, the method effectively allows the risks of the non-coordinated frequency band to be significantly lowered.

BRIEF DESCRIPTION OF THE DRAWINGS

The invention is described more closely with reference to the accompanying drawings, in which:

FIG. 6 is a block diagram illustrating first part of steps at both ends of a link;

FIG. 7 is a block diagram illustrating second part of steps at both ends of a link;

DETAILED DESCRIPTION OF THE PREFERRED EMBODIMENT

Figure 4:
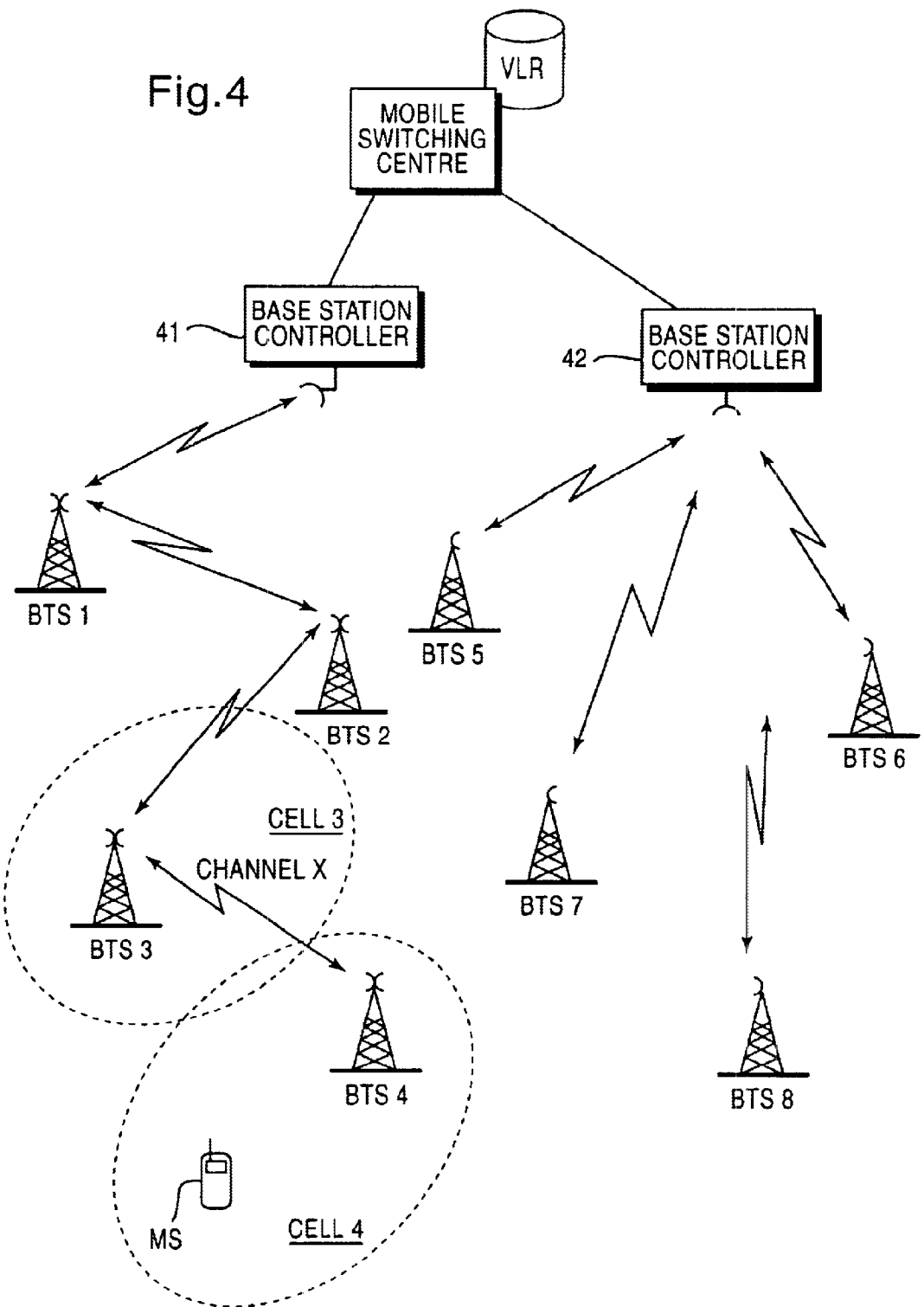
FIG. 4 illustrates a cellular network using radio links.

FIG. 4 depicts one possible telecommunications system, which a radio link system using the invented method can be applied to. The system is a cellular mobile network comprising a mobile switching center with a visitor location register, base station controllers 41 and 42, and several base transceiver stations BTS. In this example, the base station controller 41 controls base stations BTS 1, ..., BTS 4 and the base station controller 42 controls base stations BTS 5, ..., BTS 8. Mobile stations MS in a cell communicate with the network through the base station of that cell so that there is a radio connection between the MS and the BTS. The MS in the cell 4 communicates with the BTS 4.

Most often the base stations and their base station controller are interconnected with fixed trunk lines such as coaxial cables. For several reasons coaxial cable connections are not always possible. Then, a good alternative is to use radio links. This solution is illustrated in FIG. 4 where the base transceiver stations BTS 1, BTS 2, BTS 3 and BTS4 are interconnected with radio links forming a subsequent point-to-point chain. The chain can be closed as a ring by arranging a point-to-point radio link between the BTS 1 and the base station controller 41 and an additional reserve link between the BTS 4 and the station controller 41. Accordingly, the base stations BTS5, ..., BTS8 are each directly connected to the base station controller 42 with point-to-point radio links so forming topology of the star type.

How to allocate frequencies to the links in the non-coordinated 58 GHz band is explained hereafter. That band has been divided into 10 channels. Let us assume that a new link BTS 3⇆BTS 4 is to be commissioned and a channel "Channel X" for use in that link is to be allocated. Further, it is a time divided system TDD in question so that duplex communication is accomplished by the simultaneous transmission and reception of two signals, each representing different information, over a common path by using different time intervals for each signal. In other words, the duplex channel X is here defined so that it consists of one single carrier but separation between transmission and reception channels are obtained by transmitting and receiving in different time slots. The number of channels per carrier depends on how many time slots form a frame. For example, the frame might contain four time slots from which one slot is intended for transmission of traffic, one slot is intended for reception of traffic and two remaining slots are intended for transmission and reception of control information. Hence, one carrier accommodates one duplex channel for traffic information and one duplex channel for control information.

The system might be, of course, a frequency division system FDD, wherein separation between transmission and reception channels are obtained by the use of different frequencies.

Figure 5:
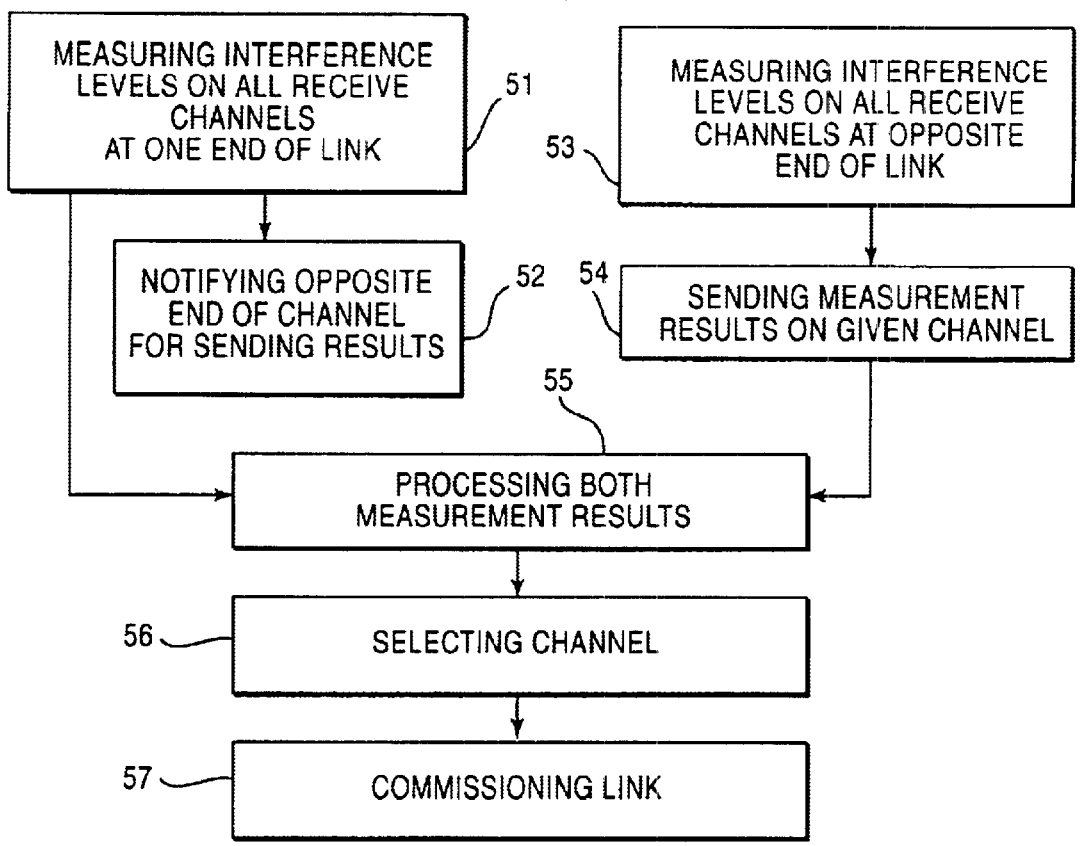
FIG. 5 depicts main steps in the invention

FIG. 5 illustrates the idea which the invention is based on. Interference levels on each receive frequency is measured both at one end of the link, stage 51, and also at the opposite end of the link, stage 53. It should be noted that one end's transmission frequency is the reception frequency at another end. After the opposite end has made its measurements it shall send measurement results to the other end. Therefore, it has to know on what channel the other end expects to have the results.

Depending on the system, the measurement may be performed in different ways. Firstly, the measurement may be performed by measuring the frequency constantly. This manner must be used in FDD systems. Secondly, if the system is a TDD system, the measurement may be performed constantly regardless if the same frequency is used by several channels, wherein the power may be at different time slots, that is, it may vary between channels, or the measurement may also be performed separately for each time slot in the frame either for each reception time slot or just for any desired time slots of the frame. In practice, the first-mentioned way of measuring the entire carrier constantly is preferable.

Based on the measurement results, the first end selects that certain channel as a communication channel on which the interference level is lowest. Then it notifies the opposite end of the selected communication channel by sending identification information on that channel, stage 52. The opposite end, which is scanning all the receive channels, receives and detects identification information on that certain channel, Now it knows that the measurement results shall be sent on that channel, wherein, after having completed measurements, it sends the results on that channel, stage 54.

Now, the interference levels on each channel is known based on measurement carried out at both ends. Therefore, by processing the results, stage 55, the best channel (channel X, FIG. 4) met a predetermined criterion can be found and selected as the information carrying channel for this link, stage 56. Finally, the link can be commissioned, stage 57.

FIGS. 6 and 7 depict in detail method steps used in accordance with the invention. The steps can be divided into two parts so that the first part ends when finding a common channel for further communication, and the second part ends in allocating a traffic channel and commissioning the link.

At the very beginning of the commissioning, the antennas of the master and the slave must be mechanically aligned. Modifying the position of the antennas is fundamental to the correct performance of the radio link. There should be a clear transmission path, preferably line-of-sight, between the two nodes of the link.

The steps in the first half are shown in FIG. 6. Either of the link ends is named as a master because it is a decision making party and the opposite end is named as a slave. For example, in FIG. 4 the BTS 3 could be the master whereas the BTS 4 is the slave. The master controls the channel selection process. The selection and indication of the master is up to the commissioner of the hop.

At the beginning, the slave node is set in receive mode, stage 65, Then, the master node scans all receive channels (i.e. frequencies) available to it and measures interference levels on each channel, stage 61. After measurement, the master node lists the receive channels in order, the best channel, that is the channel having lowest interference, being at the top of the list, stage 62.

For clarity, the above used expression "available channels" means either all channels of the system or it can also mean a set of channels which only are examined. The user might, for some reason, exclude one or more channels out of use for a link and therefore the channel assignment process speeds up when these channels are left unexamined.

Then, the master node selects the best receive channel from the list and chooses the corresponding transmission channel, stage 63. Thereafter it starts to send on that transmission channel a master signal, stage 64. The master signal contains specific information known to both link nodes. Information might be a link specific identifier or a frame alignment word reserved for the use of links for the duration of commissioning, for example.

At the same time, the slave node has been scanning all available receive channels trying to find the master signal sent by the master node, stage 66. Hence, after it has found the master signal, it, of course, knows the channel on which the master node is sending specific information. If for some reason the master signal is not found, the slave node continues scanning, stage 610. A reason for not finding the master signal could be simply that the channel carrying said signal is not available to the slave node. If the master signal is found, the slave node sends back the master signal on the corresponding transmit channel, stage 64.

The master has been waiting for response by listening the receive channel, stage 68. If no response is detected within a predetermined time, stage 69, the master node chooses the next best transmission channel from the list, stage 63, whereupon above explained process will be repeated. In case every channel of the list has been proved and no response from slave is detected, the process ends here. It means that the radio environment does not allow commissioning of the new link.

When the correct response is detected, the master node selects the transmission channel and the corresponding reception channel as the common channel, which will be used in further steps of the invented method, step 613. This channel may or may not be the channel which will be permanently assigned to the radio link.

The results of the steps carried out in accordance with FIG. 6 are as follows: the master node has knowledge of interference levels of each receive channel and both the master and the slave nodes know what duplex channel is reserved to further communication. For being able to select a channel for stationary use in the link, the master node must know interference levels of the reception channels measured by the slave node. This process will be explained next.

FIG. 7 depicts the second part of the steps. Firstly, the slave node sends a request for making its own interference measurements, stage 71. As the medium carrying the request is serving the common channel assigned in the previous part. The master node receives the request and responds by sending back an acknowledgment, stage 73. At the same moment the master node sets itself to the receive mode and stops transmission so that the carrier is totally shut down, stage 74. As a result, the carrier will not affect measurements which will be carried out by the slave node. The common channel is now one directional.

After having received the acknowledgment, the slave station starts doing measurements. It scans all receive channels available to it and measures interference levels on each channel, stage 75, and stores results temporarily into memory. After having completed measurement, the slave node sends the measurement results to the master node, which has been waiting for them, stage 76.

In the TDD system the slave node is usually synchronized with the master node, i.e. the slave receives its master clock signal from the master node. Hence, the master node has to stop its transmission only for a predetermined period after which it shall continue transmission. When the slave has detected transmission signal, it is able to restore its synchronization and it can send the measurement results in a proper time slot. In contrast to the slave node in the TDD system, the slave node in the FDD system can send the measurement results immediately after it has completed the measurements.

As a response to the received results, the master node resets transmission mode so returning duplex mode to the communication channel, stage 77. The master node has now all information needed for selecting an optimal channel for the link. A special software processes measurement results in order to find the best combination of a transmission channel and a reception channel, which together form the optimal channel for the link. Processing can be based on comparison of interference of transmission and reception channel separately with given threshold values. There might be one threshold value for a transmission channel and another value for a reception channel. This could be advantageous in case information flow in one direction in the link greatly exceeds information flow in the opposite direction. In the main direction low interference level is required whereas connection in the opposite direction is allowed to tolerate higher interference. Further, the best channel may be the channel with the lowest interference power or a channel with a signal-to-interference ratio S/I above a collision threshold level THc.

Alternatively, after the best combination has been found, the software can processe remaining frequencies and their interference for finding out the second best combination. In this way a list of channels are formed where the channels are in order, the best channel being at the top of the list, stage 78.

Next, the software selects from the list the best channel for using as the channel in bidirectional transmission, stage 79, and compares it with the previously selected common channel, stage 710.

If the channels are the same, the best channel is selected as the optimal channel. The link is commissioned and ready to use, stage 713. The slave node knows that in case no channel change command will arrive within a given time, the common channel which is already in use will be used further.

If the channels are different, the master node sends the slave node a command to change the channel, stage 711. The command includes information about the new channel. After that the link is commissioned and ready to use.

The above described procedure will be repeated again when a new link is to be commissioned.

The invented procedure could be applied also when a whole link system is to be commissioned. The invented automatic channel selection is carried out link by link and the already commissioned links remain in transmission mode so that their carrier's influence to the link being configured can be taken into account. The configuration order of the links can be selected randomly.

DESCRIPTION OF OTHER EMBODIMENTS

When the whole link system is to be configured, one or several of channels can be directly assigned to the corresponding number of radio links which are commissioned first, and the rest of the links can be configured automatically based on the interference measurements according to the invention.

Moreover, due to the fact that the channel interference strongly depends on the distance between radio links, in some cases it may be sufficient to choose one or several channels to be used by a fixed radio link based on the results of a distance measurement. Thus, it is conceivable to dispense with interference measurement and to perform channel allocation for respective radio links based on distance measurement results, like for example those results obtained by using GPS (Global Positioning System). That is, the choosing of a channel or channels for the newly commissioned radio link may be effected by choosing the channel (or channels) which are used by the most distant ones of the links commissioned earlier. Alternatively, any of the channels which are used by radio links at a distance which is larger than a given distance threshold THD may be chosen.

Figure 1:
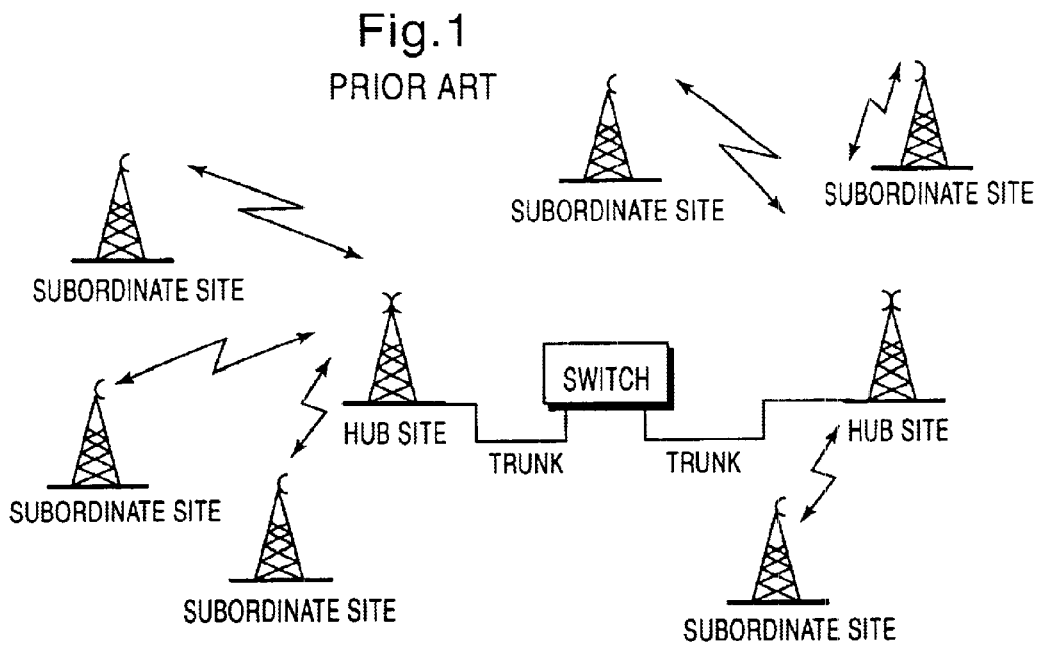
FIG. 1 depicts an example of a radio link network of the star type.
Figure 2:
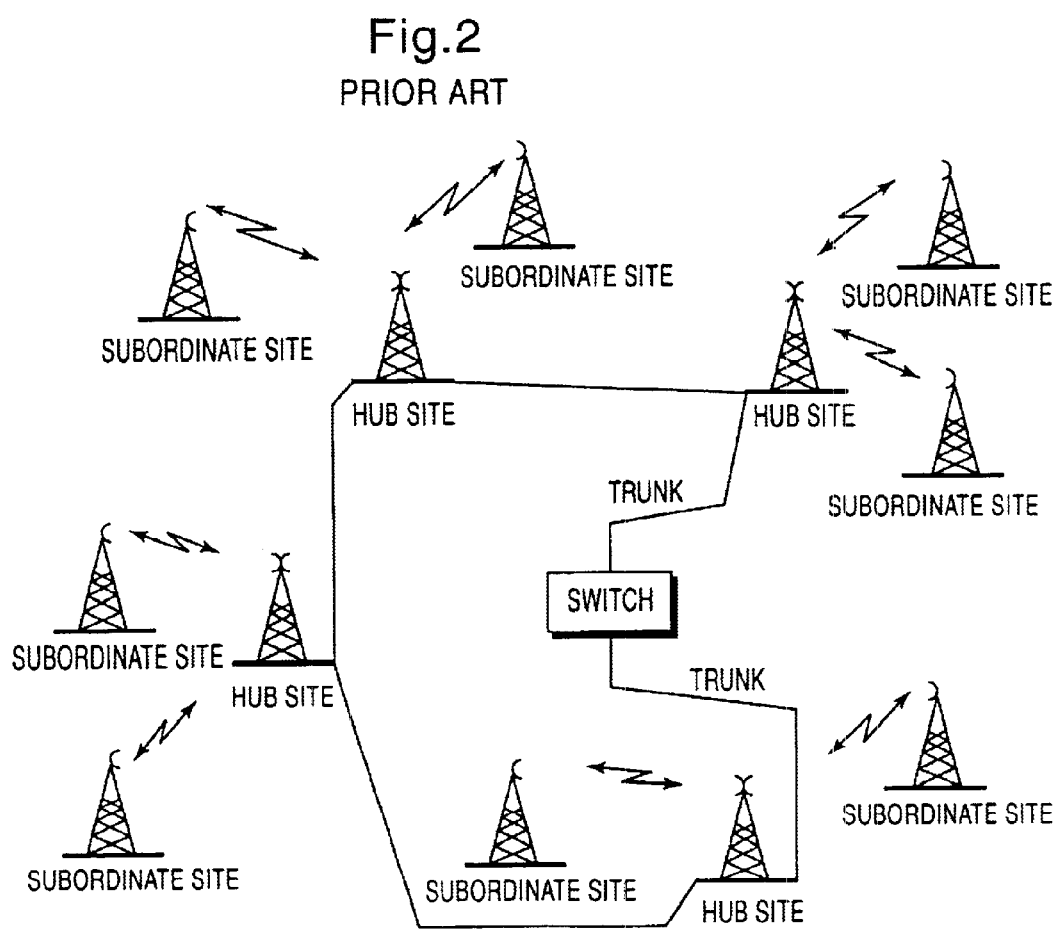
FIG. 2 shows a link network configured in a ring structure.
Figure 3:
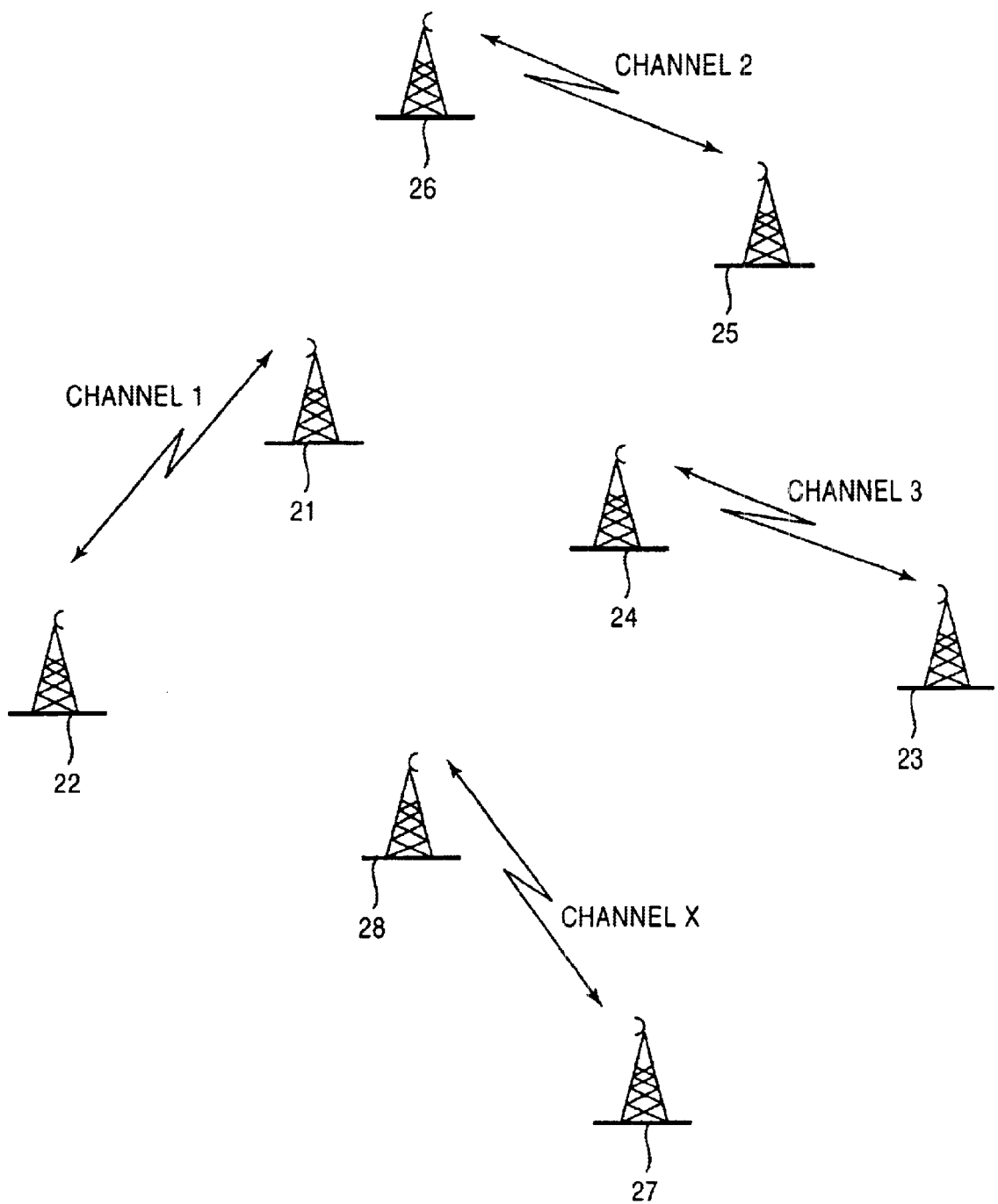
FIG. 3 is an example of a configuration of hops in a radio environment area operated in an non-coordinated frequency band according to the previously known approach.

Referring now to the example as shown in FIG. 3, under the assumption that four hops are placed in the radio environment of fixed area and that the total number of available channels is three, the distance based method works as follows.

For the first three hops that are commissioned, distinct channels (channels 1, channel 2 and channel 3) are chosen. For the fourth hop, the channel that is used in the most distant of the existing links is chosen, i.e. channel number 2 in the depicted situation. This leads to a situation in which for each new link to be established, a channel that is used far away tends to be chosen, since for such a channel the lowest interference may be expected to be measured.

However, channel assignment based on mere distance information may be inappropriate For example, in a radio environment in a mountainous/hilly area, the received interference power of a very close neighboring radio link due to mountains between the radio link to be commissioned and the neighbor hops may be less than in a plane environment. Instead, in such a case, channel assignment can be based on the evaluation of interference measurement results as explained further above. Moreover, it is also conceivable to combine both methods and to choose a channel to be assigned based on both measurement results, i.e. to choose a channel by evaluating a combination of distance and interference measurement results.

As a random network of links is built, it automatically adjusts itself to a configuration where links which use the same frequency tend to be far away from each other. The improvement in the capacity for a given probability of channel collision is thus substantial.

Figure 8:
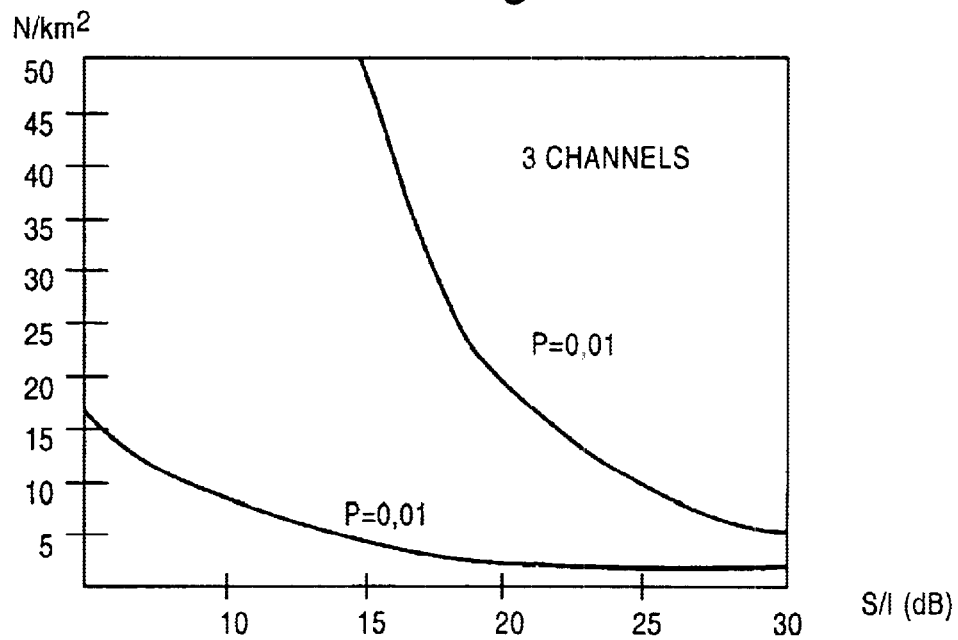
FIG. 8 is a diagram showing the effects on the number of hops per area as a function of signal interference ratio (SIR) requirements for a given value of collision illustrates a cellular network using radio links.

FIG. 8 of the accompanying drawings shows a diagram schematically illustrating the achievable improvement in capacity in case there are only three channels available. In detail, FIG. 8 shows a plot of the number of hops (N) per area ($km^2$) as a function of signal interference ratio (S/I) requirements (SIR requirement) for a given value of the collision probability P (P=0.01 in the given example).

The meaning of the channel collision probability P as a used parameter in the FIG. 8 diagram is as follows. If it is known beforehand that a number of N radio links are installed randomly within a given area, then the channel collision probability P is a measure of the likelihood that a new link, i.e. the (N+1:th) that is installed in a random place will not function, since, for example, the signal to interference requirement cannot be satisfied. For a large network of many non-coordinated links the channel collision probability defines the fraction of the links that will require special attention after installation. Preferably, this probability should be very small (typically a few percent at most), since otherwise it will become very difficult to build networks using non-coordinated links.

Observing or determining the channel collision probability may be done directly by collecting interference statistics from the network of links. The dynamics of the interference will be very slow since only upon installation of new links the situation will change. The collecting of the statistics can be done either automatically or manually. The simplest manual procedure could then be based, for example, on failure reports obtained upon installation of the links.

Now, referring back to the FIG. 8 diagram, the lower curve shows the situation for the random choice of channels, while the upper curve shows the situation when, according to the method of the present invention, for each link to be commissioned the channel with, e.g., the lowest interference level is chosen.

It can be gathered from FIG. 8 that a relatively high density of links can be installed in a given area when using the present invention, without involving an undue risk that a channel collision occurs. To be precise, let us assume in the depicted example that for signal to interference requirements a threshold of 20 dB is set and let us assume that an operator building a network using non-coordinated links is willing to accept that one out of hundred links that are installed will not work immediately, which means a collision probability of P=0.01. Those links that will not work or work only unsatisfactory must be relocated or an alternative transmission must be used. According to the prior art (lower curve in FIG. 8), only about two links per square km can be installed. However, according to the present invention (upper curve in FIG. 8), about twenty links per square km can be installed.

The improvement is more outstanding when more than three channels are available in the system. If there are 10 channels available as in the non-coordinated 58 GHz band, the link density N increases remarkable in comparison to that shown in FIG. 8.

Apparently, according to the present invention, the number of links or hops that can be commissioned in a given area may be significantly increased (about a factor of 10 or even more). At the same time, the method according to the present invention will allow the risks of the non-coordinated use, i.e. the uncontrolled use of allocated frequencies, to be lowered. Further, based on realistic numbers for penetration of such links, however, detailed calculations show that the collision probability is very close to zero for many years into the future when the present invention is used.

Moreover, it is to be noted that substantially the same approach could be used to choose CDMA-spreading codes adaptively. Adopting such an approach would then lead to a system which would always choose the code based on interference measurements, for example, the code with the lowest level of interference.

Furthermore, judging of interference levels as a result of monitoring the channels may not only be effected when assigning a channel to a radio link to be newly established. In this connection, it is also conceivable to continuously monitor the channels within the radio environment, i.e. in the fixed area, and to jump to a new channel whenever a new better channel is available. However, in such a case, appropriate countermeasures against oscillations in the non-coordinated network or band, respectively, will have to be taken. That is, indefinite changes from channel to channel within parts of the system would have to be prevented. However, it should be note that in many systems it is forbidden to change channels when the system is in operation.

It should be understood that the above description and accompanying figures are only intended to illustrate the present invention by way of example only. Thus, the method according to the invention may also be used in systems other than the described. The preferred embodiments of the method may thus vary within the scope of the attached claims.

What is claimed is:

1. A method of allocating the channels of a frequency band for a fixed link system composed of at least one radio link having a node at its both end, the method comprising the steps of:

allocating a common channel to at least one radio link, the common channel composed of a receive channel and a transmission channel, commissioning radio links which have been allocated the common channel, for at least one non-commissioned radio link, choosing one node of the radio link as a master node and the other node of the radio link as a slave node, in the master node, measuring the radio link interference level of each channel available in the master node, and according to the measurement results, choosing a receive channel having low-interference and a transmission channel corresponding to it, the receive channel and the transmission channel composing a common channel candidate, transmitting a master signal on the common channel candidate to the slave node, in the slave node, measuring the radio link interference level of each receive channel available in the slave node, sending the measurement results on the transmission channel to the master node as a response to the master signal, and in the master node, when receiving the measurement results sent by the slave node, processing the measurement results of the slave node and master node, selecting an optimal channel as a common channel, allocating the common channel to the radio link, and commissioning the link.

2. The method according to claim 1, wherein in the slave node:

all available receive channels are scanned for finding the master signal, after the master signal has been found, the response is sent back on the common channel candidate.

3. The method according to claim 1, wherein after a predetermined period without the response has lapsed, a new common channel candidate is selected.

4. The method according to claim 1, wherein after having been received the response within a predetermined period, the common channel candidate is chosen as the common channel.

5. The method according to claim 1, wherein in the slave node, a request for carrying out interference level measurements is sent to the master node through the common channel.

6. The method according to claim 1, wherein in the master node, as a response to the request, an acknowledgment is sent and the common channel carrier from the master node is muted.

7. The method according to claim 1, wherein in the slave node, as a response to the acknowledgment, measuring the interference level of each available receive channel is carried out and the measurement results are transmitted to the master node through the common channel.

8. The method according to claim 1, wherein in the master node, the measurement results obtained from both nodes are processed and an optimal channel from a number of duplex channels fulfilling a predetermined criterion is selected.

9. The method according to claim 8, wherein the optimal channel being different from the common channel a channel change command is sent to the slave node.

10. The method according to claim 1, wherein the channel with the lowest interference power is chosen as the optimal channel.

11. The method according to claim 1, wherein an arbitrary channel having an interference power below a predetermined interference threshold is chosen as the optimal channel.

12. The method according to claim 1, wherein an arbitrary channel with a signal interference ratio above a predetermined collision threshold is chosen as the optimal channel.

13. The method according to claim 1, the method comprising the further steps of:

measuring a distance from each of the radio links already commissioned to the radio link to be commissioned, thus resulting in distance measurements, and using the distance measurements when selecting the optimal channel for the radio link.

* * * * *

UNITED STATES PATENT AND TRADEMARK OFFICE
CERTIFICATE OF CORRECTION

PATENT NO. : 6,694,141 B1 Page 1 of 1
DATED : February 17, 2004
INVENTOR(S) : Pulkkinen et al.

It is certified that error appears in the above-identified patent and that said Letters Patent is hereby corrected as shown below:

Title page,
Item [63], Related U.S. Application Data, should read:
-- Continuation of application No. PCT/FI98/00247, filed on Mar. 20, 1998. --
Please add:
-- [30]  Foreign Application Priority Data
June 24, 1997 ……………………... PCT/EP97/03314 --

Signed and Sealed this

Eighteenth Day of May, 2004

JON W. DUDAS
*Acting Director of the United States Patent and Trademark Office*